US010209571B2

(12) United States Patent
Lee et al.

(10) Patent No.: US 10,209,571 B2
(45) Date of Patent: Feb. 19, 2019

(54) CURVED LIQUID CRYSTAL DISPLAY AND METHOD OF MANUFACTURING THE SAME

(71) Applicant: Samsung Display Co. Ltd., Yongin-si (KR)

(72) Inventors: Hyeok Jin Lee, Seongnam-si (KR); Oh Jeong Kwon, Hwaseong-si (KR); Jin Won Kim, Suwon-si (KR); Dong Han Song, Hwaseong-si (KR); Ki Chul Shin, Seongnam-si (KR); Taek Joon Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 78 days.

(21) Appl. No.: 15/244,478

(22) Filed: Aug. 23, 2016

(65) Prior Publication Data

US 2017/0059941 A1  Mar. 2, 2017

(30) Foreign Application Priority Data

Aug. 25, 2015  (KR) ......................... 10-2015-0119415

(51) Int. Cl.
*G02F 1/1337* (2006.01)

(52) U.S. Cl.
CPC .. *G02F 1/133711* (2013.01); *G02F 1/133707* (2013.01); *G02F 1/133753* (2013.01);
(Continued)

(58) Field of Classification Search
CPC .......................................... G02F 2001/133773
See application file for complete search history.

(56) References Cited

U.S. PATENT DOCUMENTS

2012/0212691 A1*  8/2012  Miyakawa ........ G02F 1/133788
349/86
2013/0265532 A1* 10/2013  Kim .................. G02F 1/133753
349/124
(Continued)

FOREIGN PATENT DOCUMENTS

JP         201258562      3/2012
KR       20020071724      9/2002
(Continued)

*Primary Examiner* — Alexander Gross
(74) *Attorney, Agent, or Firm* — Cantor Colburn LLP

(57) ABSTRACT

A curved liquid crystal display ("LCD") includes a thin film transistor ("TFT") array substrate, a counter substrate facing the TFT array substrate, a liquid crystal layer including liquid crystal molecules of negative dielectric anisotropy and disposed between the TFT array substrate and the counter substrate, a liquid crystal alignment layer disposed between the liquid crystal layer and the counter substrate, a liquid crystal alignment base layer disposed between the liquid crystal layer and the TFT array substrate, and a liquid crystal alignment stabilization layer including projections spaced apart from each other on the liquid crystal alignment base layer between the liquid crystal layer and the liquid crystal alignment base layer, wherein the projections include reactive mesogen polymers, and one of the liquid crystal alignment layer and the liquid crystal alignment base layer includes the reactive mesogen polymers.

3 Claims, 24 Drawing Sheets

(52) U.S. Cl.
CPC .................. *G02F 1/133788* (2013.01); *G02F 2001/133726* (2013.01); *G02F 2001/133742* (2013.01)

(56) References Cited

U.S. PATENT DOCUMENTS

| | | | |
|---|---|---|---|
| 2016/0077384 A1* | 3/2016 | Yang | G02F 1/133723 349/128 |
| 2016/0209707 A1 | 7/2016 | Suh | |
| 2017/0059941 A1 | 3/2017 | Lee et al. | |
| 2017/0090250 A1 | 3/2017 | Kim | |

FOREIGN PATENT DOCUMENTS

| | | |
|---|---|---|
| KR | 20070021145 | 2/2007 |
| KR | 1020120089080 | 8/2012 |
| KR | 1020150012093 | 2/2015 |
| KR | 1020150040616 | 4/2015 |
| KR | 1020160090451 | 8/2016 |

\* cited by examiner

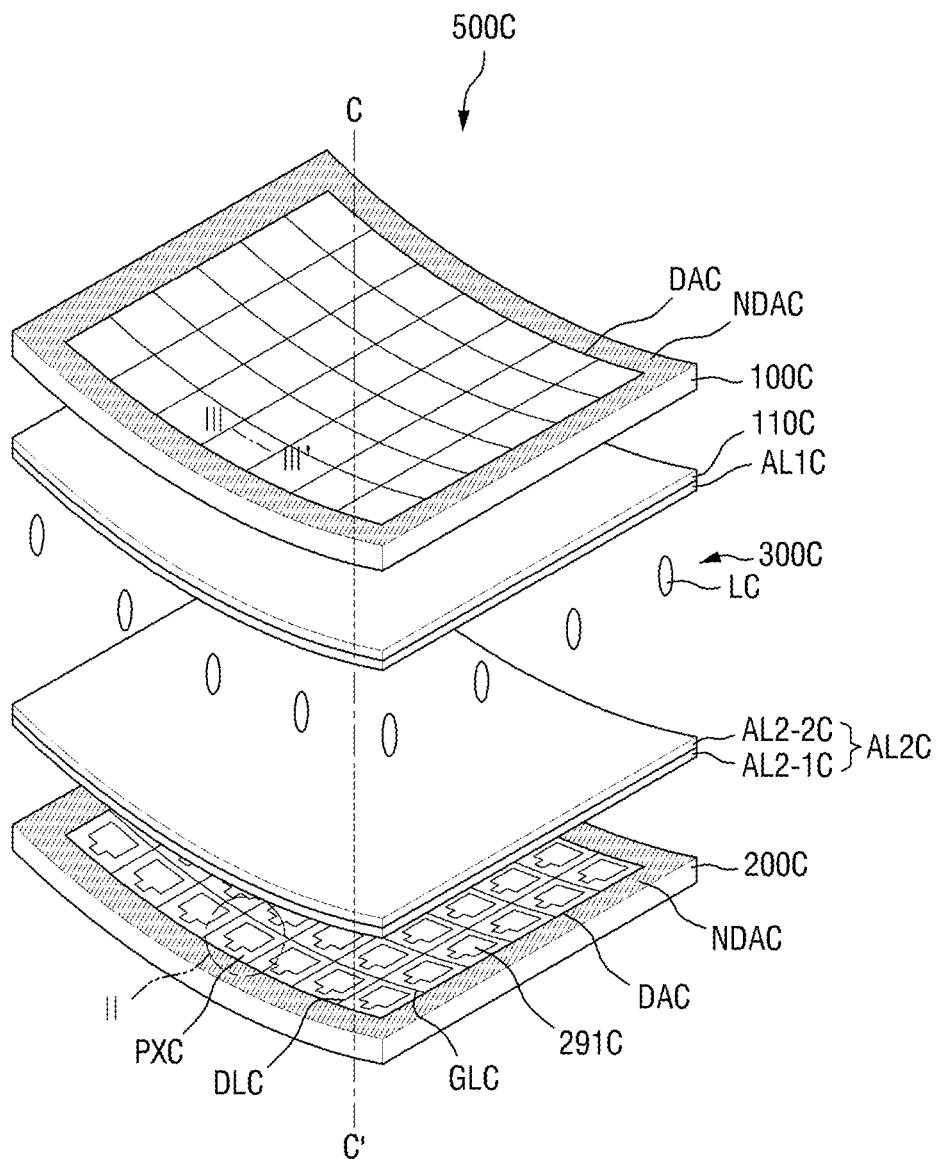

CURVED LIQUID CRYSTAL DISPLAY AND METHOD OF MANUFACTURING THE SAME

This application claims priority to Korean Patent Application No. 10-2015-0119415, filed on Aug. 25, 2015, and all the benefits accruing therefrom under 35 U.S.C. 119, the content of which in its entirety is herein incorporated by reference.

BACKGROUND

1. Field

Exemplary embodiment of the invention relate to a curved liquid crystal display and a method of manufacturing the same.

2. Description of the Related Art

A liquid crystal display ("LCD"), which is one of the most widely used flat panel display devices, includes two substrates in which field generating electrodes such as pixel electrodes and a common electrode are formed, and a liquid crystal layer interposed between the two substrates.

The LCD generates an electric field in the liquid crystal layer by applying a voltage to the field generating electrodes, and displays an image by determining the alignment direction of the liquid crystal molecules of the liquid crystal layer and controlling the polarization of incident light.

As the LCD is used as a display device of a television receiver, the size of the screen increases. As the size of the LCD increases, a visual difference may increase depending on whether a viewer views the center of the screen or the left and right ends of the screen.

In order to compensate for the visual difference, the LCD may be formed in a curved shape by bending the LCD in a concave or convex shape. A curved LCD may be of a portrait type in which, when viewed by a viewer, a vertical length is longer than a horizontal length and it is bent in a vertical direction, or a landscape type in which a vertical length is shorter than a horizontal length and it is bent in a horizontal direction.

SUMMARY

The invention provides a curved liquid crystal display ("LCD") with improved light transmittance.

According to an exemplary embodiment, a curved LCD includes a TFT array substrate, a counter substrate facing the TFT array substrate, a liquid crystal layer including liquid crystal molecules of negative dielectric anisotropy and disposed between the TFT array substrate and the counter substrate, a liquid crystal alignment layer disposed between the liquid crystal layer and the counter substrate, a liquid crystal alignment base layer disposed between the liquid crystal layer and the TFT array substrate, and a liquid crystal alignment stabilization layer including projections spaced apart from each other on the liquid crystal alignment base layer between the liquid crystal layer and the liquid crystal alignment base layer, wherein the projections include reactive mesogen polymers, and one of the liquid crystal alignment layer and the liquid crystal alignment base layer includes the reactive mesogen polymers.

According to another exemplary embodiment, a method of manufacturing a curved LCD, the method includes forming a liquid crystal alignment base layer by forming a pattern electrode including a domain divider on a TFT array substrate, coating a first vertical liquid crystal aligning agent including photopolymerization initiators on the pattern electrode, and thermally curing a coating film of the first vertical liquid crystal aligning agent, forming a liquid crystal alignment layer including reactive mesogens by forming a patternless electrode which does not have the domain divider on a counter substrate facing the TFT array substrate, coating a second vertical liquid crystal aligning agent including the reactive mesogens on the patternless electrode, and thermally curing a coating film of the second vertical liquid crystal aligning agent at a temperature at which the reactive mesogens are not polymerized, forming an LCD panel by forming a liquid crystal layer between the substrates by using a first liquid crystal composition which includes liquid crystal molecules of negative dielectric anisotropy and does not include the reactive mesogens and bonding the substrates, selectively forming a liquid crystal alignment stabilization layer including projections of reactive mesogenic polymers on the liquid crystal alignment base layer by irradiating ultraviolet rays to the LCD panel, and bending opposite ends of the LCD panel.

According to further another exemplary embodiment, a method of manufacturing a curved LCD, the method includes forming a liquid crystal alignment base layer by forming a pattern electrode including a domain divider on a TFT array substrate, coating a first vertical liquid crystal aligning agent including photopolymerization initiators on the pattern electrode, and thermally curing a coating film of the first vertical liquid crystal aligning agent, forming a liquid crystal alignment layer including reactive mesogens by forming a patternless electrode which does not have the domain divider on a counter substrate facing the TFT array substrate, coating a second vertical liquid crystal aligning agent including the reactive mesogens on the patternless electrode, and thermally curing a coating film of the second vertical liquid crystal aligning agent at a temperature at which the reactive mesogens are polymerized, forming an LCD panel by forming a liquid crystal layer between the substrates by using a second liquid crystal composition which includes liquid crystal molecules of negative dielectric anisotropy and the reactive mesogens and bonding the substrates, selectively forming a liquid crystal alignment stabilization layer including projections of reactive mesogenic polymers on the liquid crystal alignment base layer by irradiating ultraviolet rays to the LCD panel, and bending opposite ends of the LCD panel.

According to further another exemplary embodiment, a method of manufacturing a curved LCD, the method includes forming a liquid crystal alignment base layer by forming a pattern electrode including a domain divider on a TFT array substrate, coating a second vertical liquid crystal aligning agent including reactive mesogens on the pattern electrode, and thermally curing a coating film of the second vertical liquid crystal aligning agent at a temperature of about 200 degrees Celsius (° C.) to about 230° C., forming a liquid crystal alignment layer by forming a patternless electrode which does not have the domain divider on a counter substrate facing the TFT array substrate, coating a vertical liquid crystal aligning agent on the patternless electrode, and thermally curing a coating film of the vertical liquid crystal aligning agent, forming an LCD panel by forming a liquid crystal layer between the substrates by using a second liquid crystal composition which includes liquid crystal molecules of negative dielectric anisotropy and the reactive mesogens and bonding the substrates, selectively forming a liquid crystal alignment stabilization layer including projections of reactive mesogenic polymers on the liquid crystal alignment base layer by irradiating ultraviolet rays to the LCD panel, and bending opposite ends of the LCD panel.

According to the embodiments of the invention, it is possible to provide a curved LCD with improved light transmittance.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is an exploded perspective view schematically showing an exemplary embodiment of a curved liquid crystal display ("LCD") according to the invention;

DETAILED DESCRIPTION

Figure 2A:
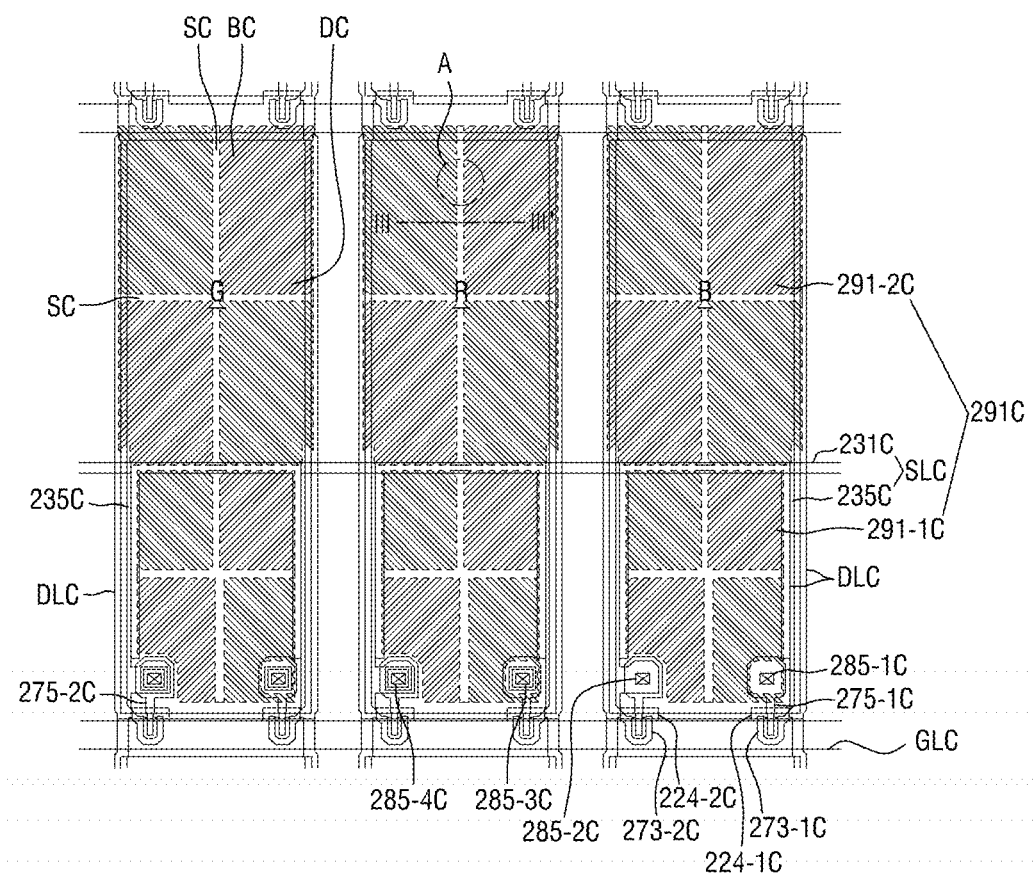
FIGS. 2A and 2B schematically illustrate a pixel electrode of a region II of FIG. 1.

Features of the invention and methods of accomplishing the same may be understood more readily by referencing the following detailed description of preferred embodiments and the accompanying drawings. The invention may, however, be embodied in many different forms and are not limited to the embodiments set forth herein. Rather, these embodiments are provided to help illustrate the invention to those of ordinary skill in the art.

In the drawings, the thickness of layers and regions are exaggerated for clarity. It will be understood that when an element or layer is referred to as being "on", "connected to" or "coupled to" another element or layer, the element or layer may be directly on, connected or coupled to another element or layer, or intervening elements or layers. In contrast, when an element is referred to as being "directly on", "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially related terms, such as "below", "lower", "under", "above", "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein may be interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention are described hereinafter with reference to the accompanying drawings.

Figure 2B:
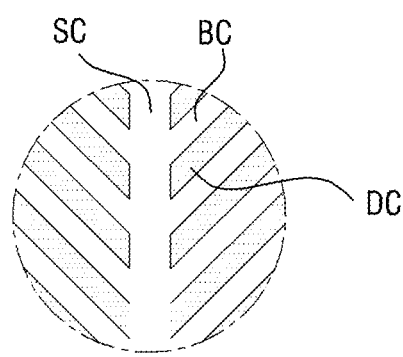

FIG. 1 is an exploded perspective view schematically showing a curved LCD according to an exemplary embodiment. FIG. 2A schematically illustrates a pixel electrode of a region II of FIG. 1, and FIG. 2B is an enlarged view of a region A of FIG. 2A.

Referring to FIGS. 1 and 2, a curved LCD 500C according to the exemplary embodiment includes a counter substrate 100C facing a TFT array substrate 200C, the TFT array substrate 200C and a liquid crystal layer 300C. The liquid crystal layer 300C may be disposed between the counter substrate 100C and the TFT array substrate 200C. In an exemplary embodiment, opposite ends of the may be curved with reference to a vertical center line C-C'.

Each of the substrates 100C and 200C includes a display area DAC and a non-display area NDAC. The display area DAC is an area in which an image is viewed and the non-display area NDAC is an area in which an image is not viewed. The non-display area NDAC surrounds the outside of the display area DAC.

A common electrode 110C may be disposed between the counter substrate 100C and the TFT array substrate 200C, and may be a patternless electrode that does not have a domain divider. A pixel electrode 291C may be disposed between the TFT array substrate 200C and the common electrode 110C, and may be a pattern electrode including the domain divider. In an exemplary embodiment, the domain divider may be, for example, a projection pattern or a slit pattern. In an exemplary embodiment, the slit pattern may include, for example, a cross-shaped stem portion SC, fine branch portions BC extending from the cross-shaped stem portion SC, and cut portions DC may be defined between the fine branch portions BC.

The liquid crystal layer 300C may be disposed between the common electrode 110C and the pixel electrode 291C. In an exemplary embodiment, the liquid crystal layer 300C may include liquid crystal molecules LC of negative dielectric anisotropy, for example. An upper liquid crystal alignment layer AL1C may be disposed between the common electrode 110C and the liquid crystal layer 300C. A lower liquid crystal alignment layer AL2C may be disposed between the pixel electrode 291C and the liquid crystal layer 300C. The lower liquid crystal alignment layer AL2C may include a liquid crystal alignment base layer AL2-1C and a liquid crystal alignment stabilization layer AL2-2C.

A plurality of gate lines GLC extending in a first direction and a plurality of data lines DLC extending in a second direction perpendicular to the first direction may be disposed on the display area DAC of the TFT array substrate 200C. The pixel electrode 291C may be disposed for each pixel PXC defined by the gate lines GLC and the data lines DLC.

The pixel electrode 291C may include sub-pixel electrodes 291-1C and 291-2C which are spaced apart from each other. In an exemplary embodiment, each of the sub-pixel electrodes 291-1C and 291-2C may generally have a rectangular shape. Each of the sub-pixel electrodes 291-1C and 291-2C may be a slit pattern electrode, for example. Specifically, the slit pattern may include the cross-shaped stem portion SC, the fine branch portions BC extending from the cross-shaped stem portion SC and the cut portions DC disposed between the fine branch portions BC. The cross-shaped stem portion SC may be disposed in a cross (+) shape in which a horizontal stem portion and a vertical stem portion intersect each other. In an exemplary embodiment, the fine branch portions BC may extend in a radial direction of approximately 45° from the cross-shaped stem portion SC in a cross (+) shape. The opposing surfaces of the cut portions DC facing each other across the horizontal stem portion may be substantially parallel to each other in the horizontal direction. The opposing surfaces of the cut portions DC facing each other across the vertical stem portion may be substantially parallel to each other in the vertical direction.

The gate lines GLC may include gate electrodes 224-1C and 224-2C protruding in the second direction from the gate lines GLC toward the pixel electrode 291C. The data lines DLC may include source electrodes 273-1C and 273-2C and drain electrodes 275-1C and 275-2C. The source electrodes 273-1C and 273-2C may be provided in a "U" shape to protrude from the data lines DLC. The drain electrodes 275-1C and 275-2C may be disposed to be spaced apart from the source electrodes 273-1C and 273-2C.

The pixel electrode 291C may be provided with a data voltage through a TFT. The gate electrodes 224-1C and 224-2C, which are control terminals of the TFT, may be electrically connected to the gate lines GLC. The source electrodes 273-1C and 273-2C, which are input terminals of the TFT, may be electrically connected to the data lines DLC through contact holes 285-1C, 285-2C, 285-3C and 285-4C. The drain electrodes 275-1C and 275-2C, which are output terminals of the TFT, may be electrically connected to the pixel electrode 291C.

The pixel electrode 291C may generate an electric field in cooperation with the common electrode 110C to control an alignment direction of the liquid crystal molecules LC of the liquid crystal layer 300C disposed therebetween. The pixel electrode 291C may distort the electric field to control the alignment direction of the liquid crystal molecules LC.

The TFT array substrate 200C may have a stacked structure including a base substrate (not shown) including glass or polymer, the gate electrodes 224-1C and 224-2C, a gate insulating film (not shown), a semiconductor layer (not shown), an ohmic contact layer (not shown), the source electrodes 273-1C and 273-2C, the drain electrodes 275-1C and 275-2C, a passivation film (not shown), an organic film (not shown) and the like.

A channel of the TFT may include a semiconductor layer (not shown). The semiconductor layer (not shown) may be disposed to overlap with the gate electrodes 224-1C and 224-2C. The source electrodes 273-1C and 273-2C and the drain electrodes 275-1C and 275-2C may be separated, respectively, by the semiconductor layer (not shown).

A sustain electrode line SLC may include a stem line 231C disposed substantially parallel to the gate lines GLC and a plurality of branch lines 235C extending from the stem line 231C. The sustain electrode line SLC may be omitted and the shape and arrangement may be variously modified.

The non-display area NDAC may be a light-shielding region surrounding the outside of the display area DAC as a peripheral portion of the display area DAC. A driving unit (not shown) may be disposed on the non-display area NDAC of the TFT array substrate 200C to provide a gate driving signal, a data driving signal or the like to each pixel PXC of the display area DAC. The gate lines GLC and the data lines DLC may extend to the non-display area NDAC from the display area DAC to be electrically connected to the driving unit (not shown).

The counter substrate 100C may be a counter substrate of the TFT array substrate 200C. The common electrode 110C may be disposed on the counter substrate 100C.

A color filter layer (not shown) may be provided in a region corresponding to each pixel PXC in the display area DAC, and may include a red color filter R, a green color filter G, and a blue color filter B. The color filter layer (not shown) may be included in one of the counter substrate 100C and the TFT array substrate 200C. In an exemplary embodiment, when the counter substrate 100C includes the color filter layer (not shown), the counter substrate 100C may have a stacked structure including a base substrate including glass or polymer, the color filter layer (not shown), and an overcoat layer (not shown), for example. The overcoat layer (not shown) may be a planarization layer covering the color filter layer (not shown). In this case, the common electrode 110C may be disposed on the overcoat layer (not shown).

For example, when the TFT array substrate 200C includes the color filter layer (not shown), the TFT array substrate 200C may have a color filter on array ("COA") structure in which color filters are disposed on a transparent insulating substrate on which the TFT is disposed. In an exemplary embodiment, the color filter layer (not shown) may be disposed between an organic film (not shown) and a passivation film (not shown) covering the source electrodes 273-1C and 273-2C and the drain electrodes 275-1C and 275-2C, for example.

A light-shielding pattern layer (not shown) may be disposed at a boundary between the color filters R, G and B. The light-shielding pattern layer (not shown) may be included in one of the counter substrate 100C and the TFT array substrate 200C. In an exemplary embodiment, the light-shielding pattern layer (not shown) may be a black matrix, for example.

When manufacturing a curved LCD, in a process of bending a flat panel LCD, misalignment may occur between an upper curved substrate and a lower curved substrate due to stress applied to each of an upper plate substrate and a lower plate substrate. In an exemplary embodiment, in a process of bending the flat panel LCD, the upper curved substrate may be shifted to the left or to the right with respect to the lower curved substrate, for example. In this case, the arrangement between the upper curved substrate and the lower curved substrate may differ from the pre-designed arrangement between the upper plate substrate and the lower plate substrate. The misalignment between the upper curved substrate and the lower curved substrate may degrade the display quality of the curved LCD.

In an exemplary embodiment, in the case of manufacturing a curved LCD by using a flat panel LCD in which each flat plate substrate has a predetermined pretilt angle to form a plurality of domains in which liquid crystal molecules are inclined with different alignment directions, and each flat plate substrate includes a liquid crystal alignment stabilization layer including projections of reactive mesogen polymers, the misalignment of each flat plate substrate due to stress applied to each plate substrate may shift a boundary region of the domains, for example. The misalignment of the boundary region of the domains may cause interference or collision of liquid crystal molecules aligned on the surface of the liquid crystal alignment stabilization layer in the alignment direction. Accordingly, the liquid crystal molecules located between the liquid crystal molecules aligned on the surface of the liquid crystal alignment stabilization layer may be substantially vertically aligned. As a result, in the curved LCD, the texture may be viewed as a smudge or dark spot, and the light transmittance of the curved LCD may be reduced.

In the curved LCD 500C according to the exemplary embodiment, the liquid crystal alignment stabilization layer AL2-2C is selectively provided only in the lower liquid crystal alignment layer AL2C, and a pretilt angle of the liquid crystal molecules LC aligned on the surface of the lower liquid crystal alignment layer AL2C is made different from a pretilt angle of the liquid crystal molecules LC aligned on the surface of the upper liquid crystal alignment layer AL1C, thereby improving the light transmittance reduction caused by the texture.

Figure 3:
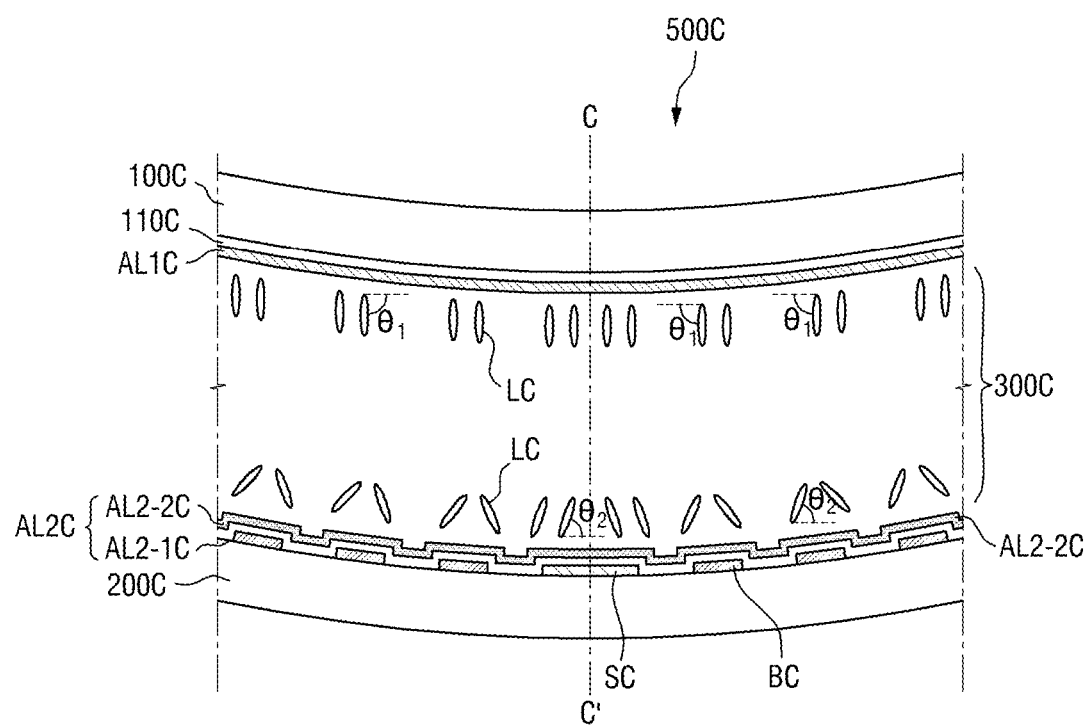
FIG. 3 is a schematic cross-sectional view taken along line III-III' of FIG. 1.

Hereinafter, the curved LCD 500C according to the exemplary embodiment will be described in more detail with reference to FIG. 3. FIG. 3 is a schematic cross-sectional view taken along line III-III' of FIG. 1. FIG. 3 schematically illustrates the alignment of the liquid crystal molecules LC in an initial state where an electric field is not applied to the curved LCD 500C according to the exemplary embodiment.

Referring to FIG. 3, the curved LCD 500C includes the upper liquid crystal alignment layer AL1C and the lower liquid crystal alignment layer AL2C. The upper liquid crystal alignment layer AL1C may be a vertical alignment layer having a vertical alignment group in a side chain. In an exemplary embodiment, the vertical alignment group may be an alkyl group, a hydrocarbon derivative whose end has been substituted with an alkyl group, a hydrocarbon derivative whose end has been substituted with a cycloalkyl group, a hydrocarbon derivative whose end has been substituted with an aromatic hydrocarbon group, or the like.

The lower liquid crystal alignment layer AL2C includes the liquid crystal alignment base layer AL2-1C and the liquid crystal alignment stabilization layer AL2-2C. The liquid crystal alignment base layer AL2-1C may be a vertical alignment layer having a vertical alignment group in a side chain. The liquid crystal alignment stabilization layer AL2-2C including projections of reactive mesogen polymers, and the projections of reactive mesogen polymers are disposed to be spaced apart from each other on the surface of the liquid crystal alignment base layer AL2-1C.

Figure 4:
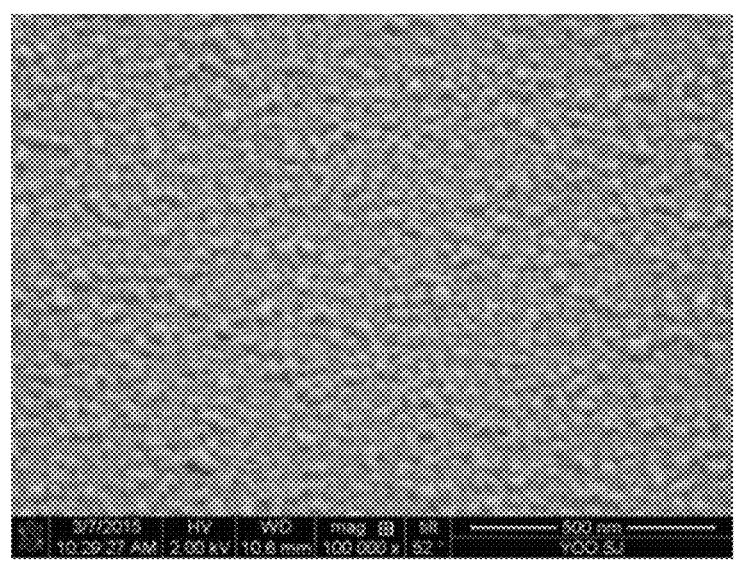
FIG. 4 is a photograph of the surface of a lower liquid crystal alignment layer of FIG. 3.
Figure 5:
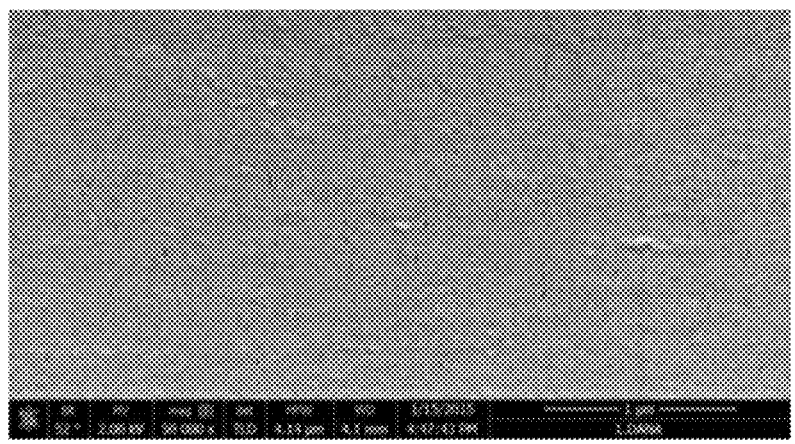
FIG. 5 is a photograph of the surface of an upper liquid crystal alignment layer of FIG. 3.

Unlike the upper liquid crystal alignment layer AL1C, only the lower liquid crystal alignment layer AL2C includes the liquid crystal alignment stabilization layer AL2-2C including projections of reactive mesogen polymers. FIG. 4 is a photograph of the surface of the lower liquid crystal alignment layer of FIG. 3. FIG. 5 is a photograph of the surface of the upper liquid crystal alignment layer of FIG. 3. Referring to FIGS. 4 and 5, the liquid crystal alignment stabilization layer AL2-2C including projections of reactive mesogen polymers is selectively provided only in the lower liquid crystal alignment layer AL2C.

The pretilt angle of the liquid crystal molecules LC may be adjusted by controlling the concentration of reactive mesogens, the concentration of a polymerization initiator, a voltage and a light irradiation amount. As the more projections of reactive mesogen polymers are provided, the liquid crystal molecules LC can be aligned to be inclined, and the projections of reactive mesogen polymers may fix or stabilize the inclined alignment of the liquid crystal molecules LC aligned on the surface of the lower liquid crystal alignment layer AL2C. As the concentration of the polymerization initiator is higher, the more projections of reactive mesogen polymers may be provided. Since the polymerization initiator initiates the polymerization reaction of the reactive mesogens, the polymerization reaction of the reactive mesogens may have selectivity by adjusting the concentration of the polymerization initiator.

The reactive mesogens are compounds having a mesogenic structure for exhibiting liquid-crystalline properties and a polymerizable end group for polymerization, and may be represented by the following formula 1:

P1-SP1-MG-SP2-P2 <formula 1>

In the above formula 1, each of P1 and P2 is a polymerizable end group such as a (meth) acrylate group, a vinyl group, a vinyloxy group, and an epoxy group. SP1 is a spacer group linking P1 with MG, for example, an alkyl group having a carbon number of 1 to 12, an alkoxy group having a carbon number of 1 to 12, or the like. SP2 is a spacer group linking P2 with MG, for example, an alkyl group having a carbon number of 1 to 12, an alkoxy group having a carbon number of 1 to 12, or the like. MG is a mesogenic structure, for example, cyclohexyl, biphenyl, terphenly, naphthalene or the like.

In an exemplary embodiment, the polymerization initiator may be at least one of, but not limited to, acetophenone, benzoin, benzophenone, diethoxyacetophenone, phenyletone, thioxanthone, 2-hydroxy-2-methyl-1-phenylpropane-1-on, benzyl dimethyl tar, 4-(2-hydroxy ethoxy)phenyl-(2-hydroxy)-2-propyl ketone, 1-hydroxycyclohexylphenyl ketone, methyl o-benzoylbenzoate, 4-phenyl benzophenone, 4-benzoyl-4'-methyl-diphenyl sulfide, (4-benzoyl-benzyl) trimethyl ammonium chloride, bis(2,4,6-trimethylbenzoyl)-phenyl phosphine oxide, diphenyl(2,4,6-trimethylbenzoyl)-phosphine oxide, 2-hydroxymethyl-propionic nitrile, 2,2'-azobis(2-methyl-N-[1,1'-bis(hydroxymethyl)-2-hydroxyethyl) propionamide], acrylic acid [(2-methoxy-2-phenyl-2-benzoyl)-ethyl] ester, phenyl-2-acryloyloxy-2-propyl ketone, phenyl 2-metacryloyloxy-2-propyl ketone, 4-isopropylphenyl 2-acryloyloxy-2-propyl ketone, 4-chlorophenyl 2-acryloyloxy-2-propyl ketone, 4-dodecyl phenyl 2-acryloyloxy-2-propyl ketone, 4-methoxyphenyl 2-acryloyloxy-2-propyl ketone, 4-acryloyloxyphenyl 2-hydroxy-2-propyl ketone, 4-metacryloyloxyphenyl 2-hydroxy-2-propyl ketone, 4-(2-acryloyloxyethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethylthio)-phenyl 2-hydroxy-2-propyl ketone, 4-N,N'-bis-(2-acryloyloxyethyl)-aminophenyl 2-hydroxy-2-propyl ketone, 4-acryloyloxyphenyl 2-acryloyloxy-2-propyl ketone, 4-metacryloyloxyphenyl 2-metacryloyloxy-2-propyl ketone, 4-(2-acryloyloxyethoxy)-phenyl 2-acryloyloxy-2-propyl ketone, 4-(2-acryloyloxydiethoxy)-phenyl 2-acryloyloxy-2-propyl ketone, dibenzyl ketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acyl phosphine, and α-aminoketone, for example.

In an exemplary embodiment, the liquid crystal alignment base layer AL2-1C may include a photopolymerization initiator or decomposition products of the photopolymerization initiator. This is because the liquid crystal alignment stabilization layer AL2-2C including projections of reactive mesogen polymers is provided only in the liquid crystal alignment base layer AL2-1C by selectively causing the reactive mesogens to perform a polymerization reaction only on the liquid crystal alignment base layer AL2-1C. A more specific description will be given below with reference to FIGS. 6 to 10.

In a state where an electric field is not applied to the curved LCD 500C, the liquid crystal molecules LC aligned on the surface of the lower liquid crystal alignment layer AL2C are substantially vertically aligned relatively to the liquid crystal molecules LC aligned on the surface of the upper liquid crystal alignment layer AL1C, and the liquid crystal molecules LC aligned on the surface of the upper liquid crystal alignment layer AL1C are obliquely aligned relatively to the liquid crystal molecules LC aligned on the surface of the lower liquid crystal alignment layer AL2C. In other words, a pretilt angle of the liquid crystal molecules LC aligned on the surface of the upper liquid crystal alignment layer AL1C is larger than a pretilt angle of the liquid crystal molecules LC aligned on the surface of the lower liquid crystal alignment layer AL2C ($\theta1>\theta2$), and a pretilt angle of the liquid crystal molecules LC aligned on the surface of the lower liquid crystal alignment layer AL2C is smaller than a pretilt angle of the liquid crystal molecules LC aligned on the surface of the upper liquid crystal alignment layer AL1C ($\theta1>\theta2$).

A pretilt angle is an angle between the substrates 100C and 200C and the director of the liquid crystal molecules LC. The pretilt angle of the liquid crystal molecules LC at an apex of the substrates 100C and 200C is substantially the same as the pretilt angle of the liquid crystal molecules LC in the flat plate substrates. In an exemplary embodiment, a curvature radius R of the curved LCD 500C may be equal to or greater than 2000 millimeters (mm) and equal to or less than 5000 mm, for example. In this case, at the apex of the substrates 100C and 200C, the pretilt angle of the liquid crystal molecules LC is substantially the same as the pretilt angle of the liquid crystal molecules LC in the flat plate substrates. The apex means, as any point on a curve, a point at which the slope of the tangent is substantially zero. A difference ($\theta1>\theta2$) between the pretilt angles of the liquid crystal molecules LC aligned on the surface of the upper liquid crystal alignment layer AL1C and the liquid crystal molecules LC aligned on the surface of the lower liquid crystal alignment layer AL2C is due to a difference in the content of the projections of reactive mesogen polymers. In other words, a difference ($\theta1>\theta2$) between the pretilt angles of the liquid crystal molecules LC aligned on the surface of the upper liquid crystal alignment layer AL1C and the liquid crystal molecules LC aligned on the surface of the lower liquid crystal alignment layer AL2C is due to the presence or absence of the liquid crystal alignment stabilization layer AL2-2C or a difference in the content of the liquid crystal alignment stabilization layer.

FIGS. 6 to 10 are cross-sectional views schematically showing a method of manufacturing the curved LCD 500C. Hereinafter, a method of manufacturing the curved LCD 500C will be described with reference to FIGS. 6 to 10.

In the following description, a vertical liquid crystal aligning agent may be, for example, a liquid crystal aligning agent including a polyimide-based polymer having only a vertical alignment group introduced into the side chain. The vertical alignment group may be chemically bonded to a main chain of the polyimide-based polymer via a spacer.

A vertical liquid crystal aligning agent including photopolymerization initiators is defined as a first vertical liquid crystal aligning agent, and a vertical liquid crystal aligning agent including reactive mesogens is defined as a second vertical liquid crystal aligning agent.

Specifically, the first vertical liquid crystal aligning agent may be, for example, a liquid crystal aligning agent including a polyimide-based polymer having a vertical alignment group and a polymerization initiator introduced into the side chain. The vertical alignment group and the polymerization initiator may be chemically bonded to the main chain of the polyimide-based polymer via a spacer. The second vertical liquid crystal aligning agent may be a liquid crystal aligning agent in which the reactive mesogens are mixed with the vertical liquid crystal aligning agent.

In addition, a first liquid crystal composition is a liquid crystal composition which includes only liquid crystal molecules of negative dielectric anisotropy and does not include reactive mesogens. In an exemplary embodiment, a second liquid crystal composition is a liquid crystal composition which includes both liquid crystal molecules of negative dielectric anisotropy and reactive mesogens.

Figure 6:
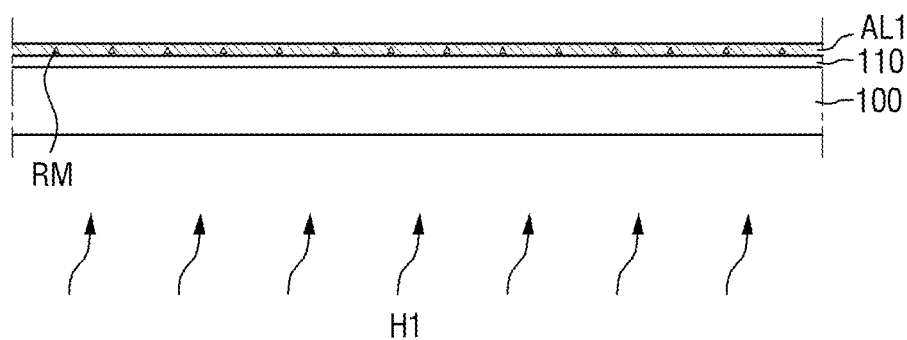
FIGS. 6 to 10 are cross-sectional views schematically showing a method of manufacturing the exemplary embodiment of a curved LCD shown in FIG. 1 according to the invention.

Referring to FIG. 6, a liquid crystal alignment layer AL1 including the reactive mesogens may be provided by forming a common electrode 110 on a counter substrate 100, coating the second vertical liquid crystal aligning agent on the common electrode 110, and thermally curing (H1) a coating film of the second vertical liquid crystal aligning agent at a temperature, e.g., about 200 degrees Celsius (° C.), at which the reactive mesogens are not polymerized.

Figure 7A:
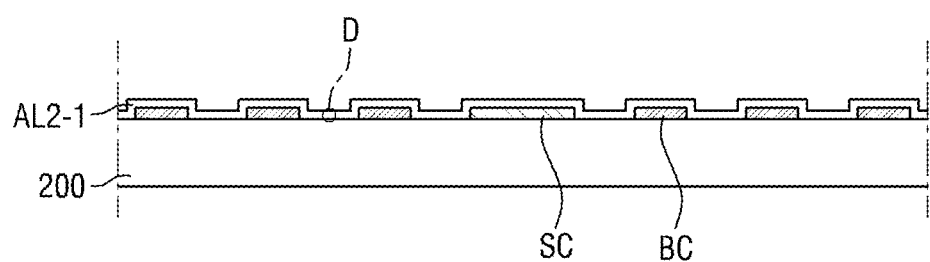
Figure 7B:
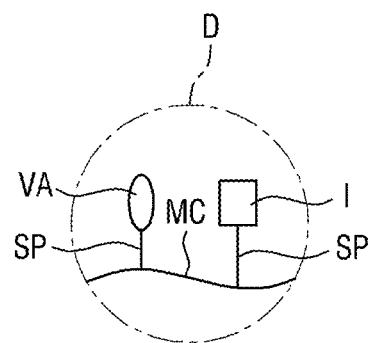

FIG. 7B is an enlarged view of a region D of FIG. 7A. Referring to FIGS. 7A and 7B, a liquid crystal alignment base layer AL2-1 may be provided by forming pixel electrodes SC and BC on a TFT array substrate 200, coating the first vertical liquid crystal aligning agent on the pixel electrodes SC and BC (refer to FIGS. 2A and 2B), and thermally curing a coating film of the first vertical liquid crystal aligning agent at a temperature, e.g., about 200° C. A vertical alignment group VA and a polymerization initiator I may be chemically bonded to a main chain MC of a polyimide-based polymer via a spacer SP.

Figure 8:
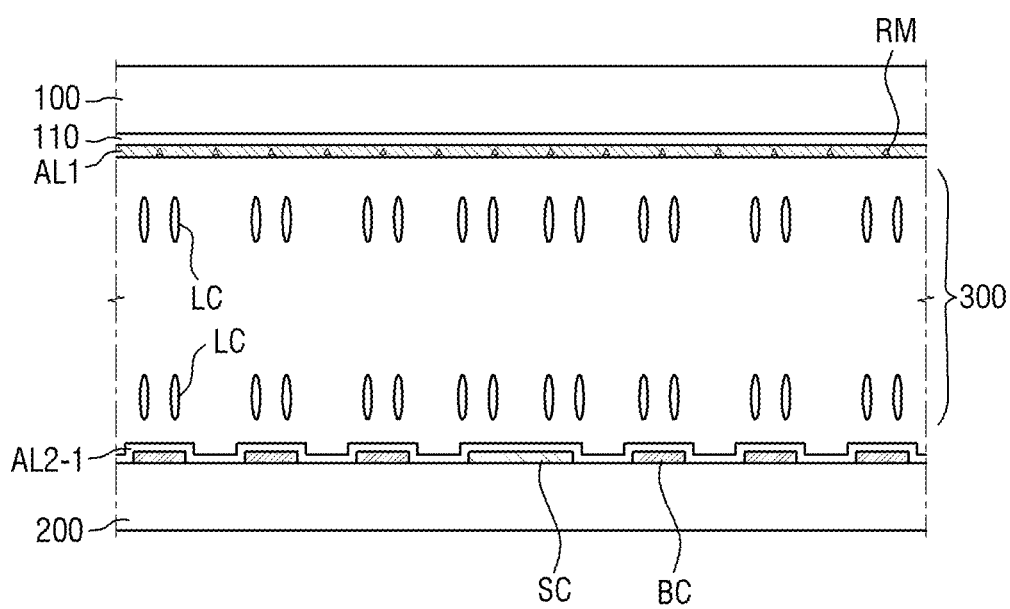

Referring to FIG. 8, a liquid crystal layer 300 may be provided by using a first liquid crystal composition between the substrates 100 and 200. The liquid crystal molecules LC are substantially vertically aligned with respect to each of the substrates 100 and 200 in an initial state where an electric field is not generated between the electrodes 110, SC and BC. In this case, substantially vertically aligning the liquid crystal molecules LC with respect to each of the substrates 100 and 200 means aligning the liquid crystal molecules LC at a pretilt angle ranging from 88° to 90° with respect to each of the substrates 100 and 200.

Figure 9:
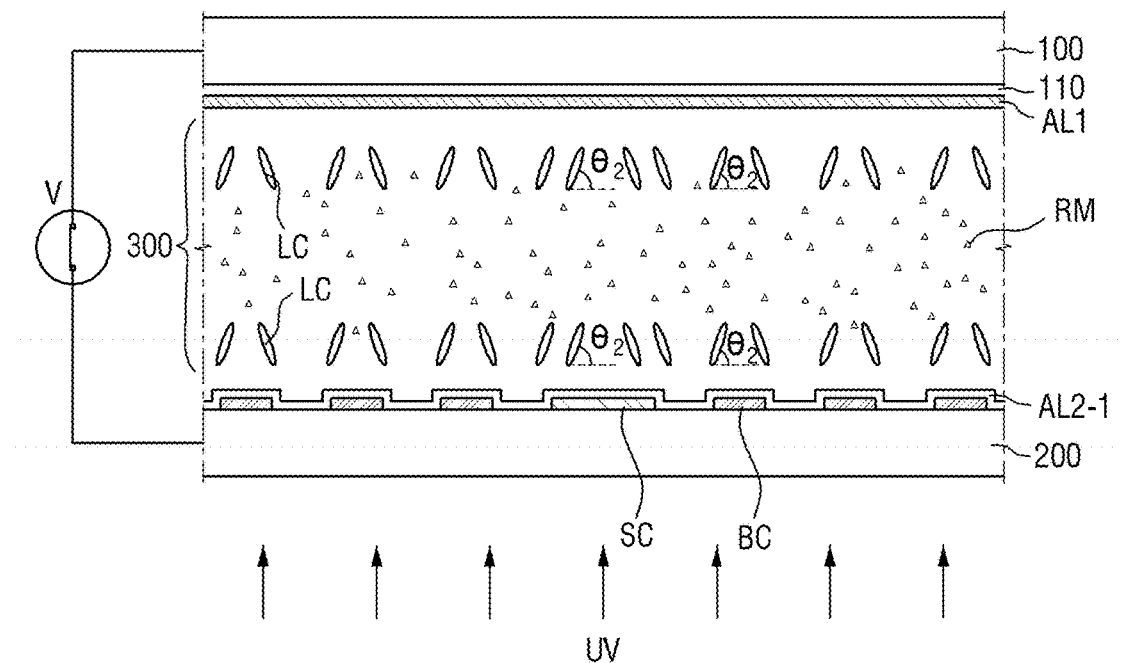

Referring to FIG. 9, after forming a liquid crystal layer 300, reactive mesogens RM are eluted to the liquid crystal layer 300 from the liquid crystal alignment layer AL1. When an electric field is generated between the electrodes 110, SC and BC, the liquid crystal molecules LC are rotated in a direction perpendicular to the electric field. At this time, when irradiated with ultraviolet light UV, the polymerization initiator included in the liquid crystal alignment base layer AL2-1 initiates the photopolymerization reaction of the reactive mesogens RM. However, since the polymerization initiator is not included in the liquid crystal alignment layer AL1, the photopolymerization reaction of the reactive mesogens RM takes place substantially only on the liquid crystal alignment base layer AL2-1.

Figure 10:
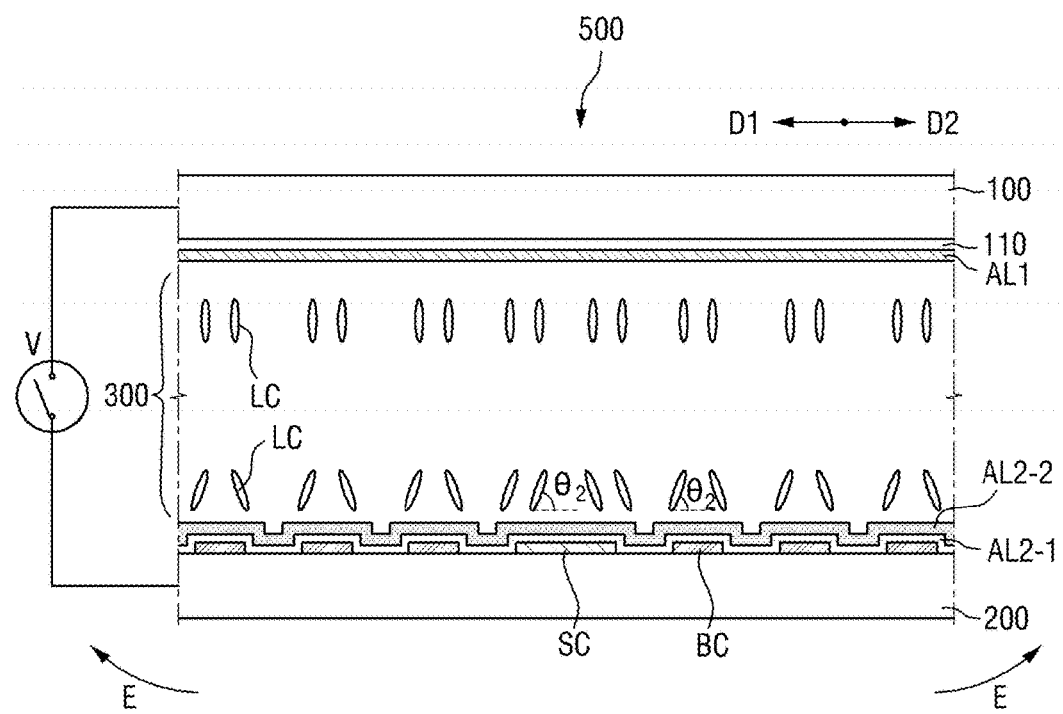

Referring to FIG. 10, when an electric field generated between the electrodes 110, SC and BC is removed, the liquid crystal molecules LC aligned on the surface of the liquid crystal alignment layer AL1 are substantially vertically aligned as in the initial state, whereas the liquid crystal molecules LC aligned on the surface of a liquid crystal alignment stabilization layer AL2-2 are maintained in an inclined alignment state while maintaining a predetermined pretilt angle θ2.

In an LCD panel 500, a pretilt angle θ1 of liquid crystal molecules aligned on the surface of the liquid crystal alignment layer AL1 is larger than the pretilt angle θ2 of the liquid crystal molecules LC aligned on the surface of the liquid crystal alignment stabilization layer AL2-2. A difference (θ1>θ2) between the pretilt angles is substantially equal to a difference (θ1>θ2) between the pretilt angles at an apex of the curved LCD 500C (refer to FIG. 3).

By bending (e.g., along a direction E) opposite ends of the LCD panel 500, the curved LCD 500C (refer to FIG. 3) can be manufactured. In this case, one of the substrates 100 and 200 may be moved in a first direction D1 or a second direction D2. Accordingly, in the curved LCD 500C (refer to FIG. 3), misalignment may occur between the substrates 100C and 200C (refer to FIG. 3). However, in the curved LCD 500C (refer to FIG. 3), by selectively forming the liquid crystal alignment stabilization layer AL2-2C (refer to FIG. 3) only in the lower liquid crystal alignment layer AL2C (refer to FIG. 3), and making a pretilt angle of the liquid crystal molecules LC aligned on the surface of the lower liquid crystal alignment layer AL2C (refer to FIG. 3) different from a pretilt angle of the liquid crystal molecules LC aligned on the surface of the upper liquid crystal alignment layer AL1C (refer to FIG. 3), it is possible to improve the light transmittance reduction caused by the texture.

Figure 11:
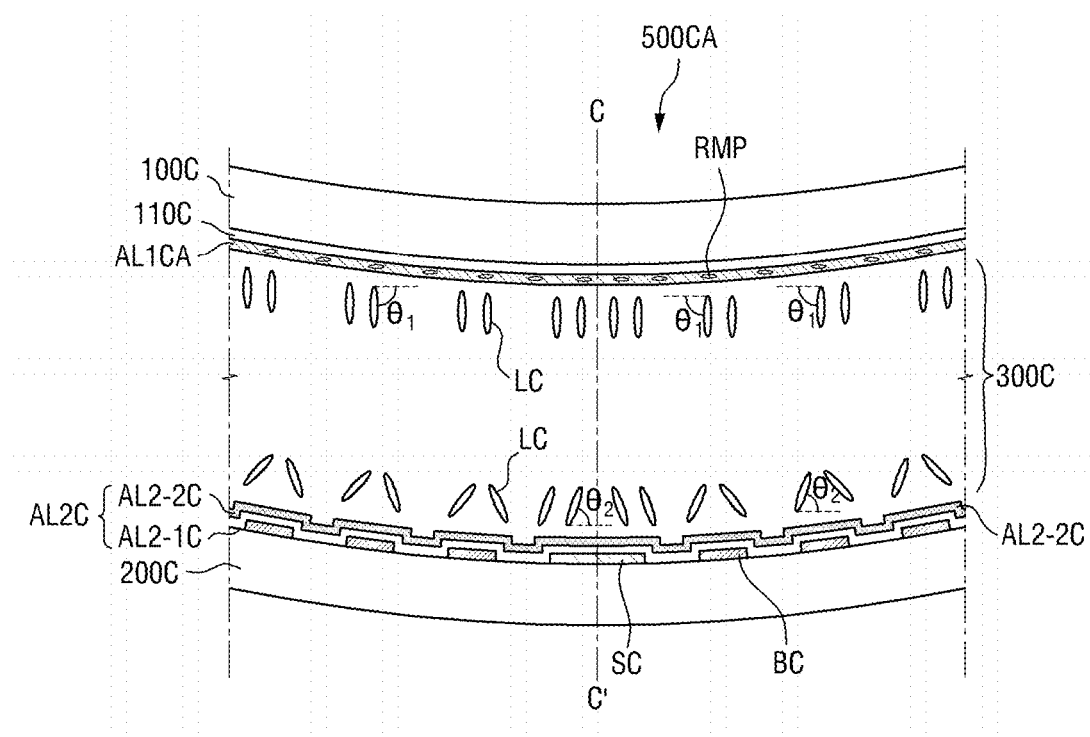
FIG. 11 is a schematic cross-sectional view of an exemplary embodiment of a curved LCD according to the invention.

FIG. 11 is a schematic cross-sectional view of a curved LCD 500CA according to an exemplary embodiment. FIGS. 12 to 17 are cross-sectional views schematically showing a method of manufacturing the curved LCD 500CA according to the exemplary embodiment.

In the following description, only differences from the curved LCD 500C (refer to FIG. 3) and a method of manufacturing the same according to the exemplary embodiment will be described, and redundant description thereof will be omitted.

The curved LCD 500CA is different from the curved LCD 500C (refer to FIG. 3) according to the exemplary embodiment in that an upper liquid crystal alignment layer AL1CA includes reactive mesogen polymers RMP.

Figure 12:
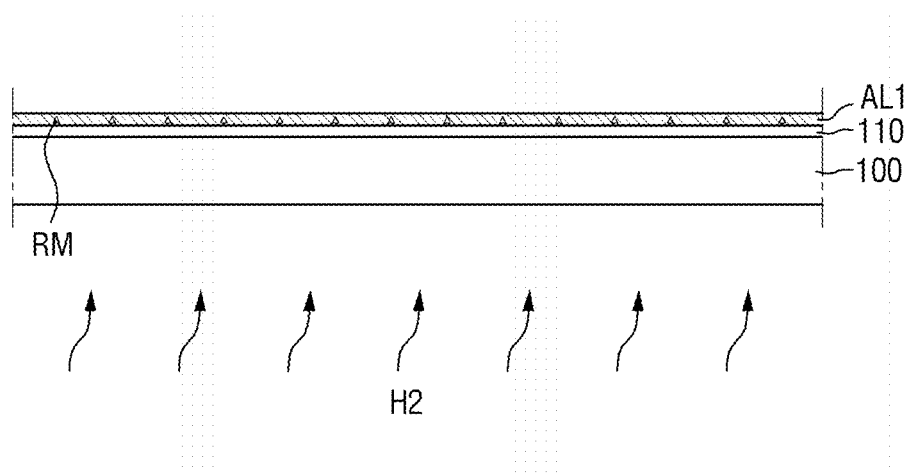
FIGS. 12 to 17 are cross-sectional views schematically showing a method of manufacturing the exemplary embodiment of a curved LCD shown in FIG. 11 according to the invention.
Figure 13:
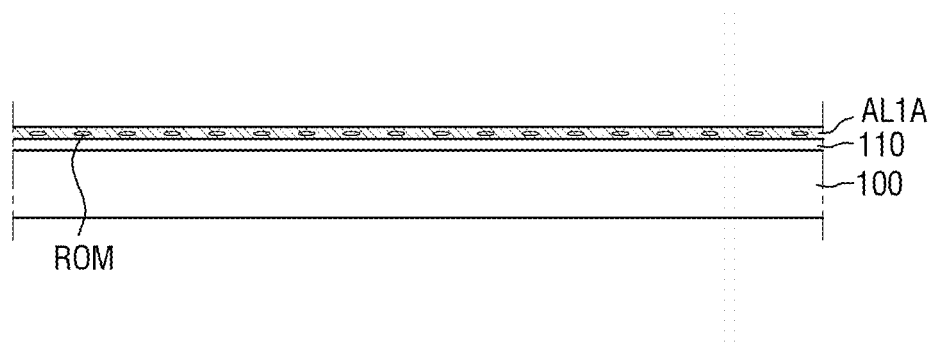

Referring to FIGS. 12 and 13, a method of manufacturing the curved LCD 500CA is different from a method of manufacturing the curved LCD 500C (refer to FIG. 3) according to the exemplary embodiment (refer to FIG. 6) in that after forming the common electrode 110 on the counter substrate 100 and coating the second vertical liquid crystal aligning agent on the common electrode 110, the reactive mesogens are thermally polymerized by thermally curing (H2) a coating film of the second vertical liquid crystal aligning agent at a temperature, e.g., about 230° C., at which the reactive mesogens are polymerized. Specifically, referring to FIG. 6, the coating film of the second vertical liquid crystal aligning agent is thermally cured (H1) at a temperature, e.g., about 200° C., at which the reactive mesogens are not polymerized. Although not shown, the reactive mesogens may be photocured by additionally irradiating ultraviolet rays during thermosetting coating of the second vertical liquid crystal aligning agent.

Figure 15:
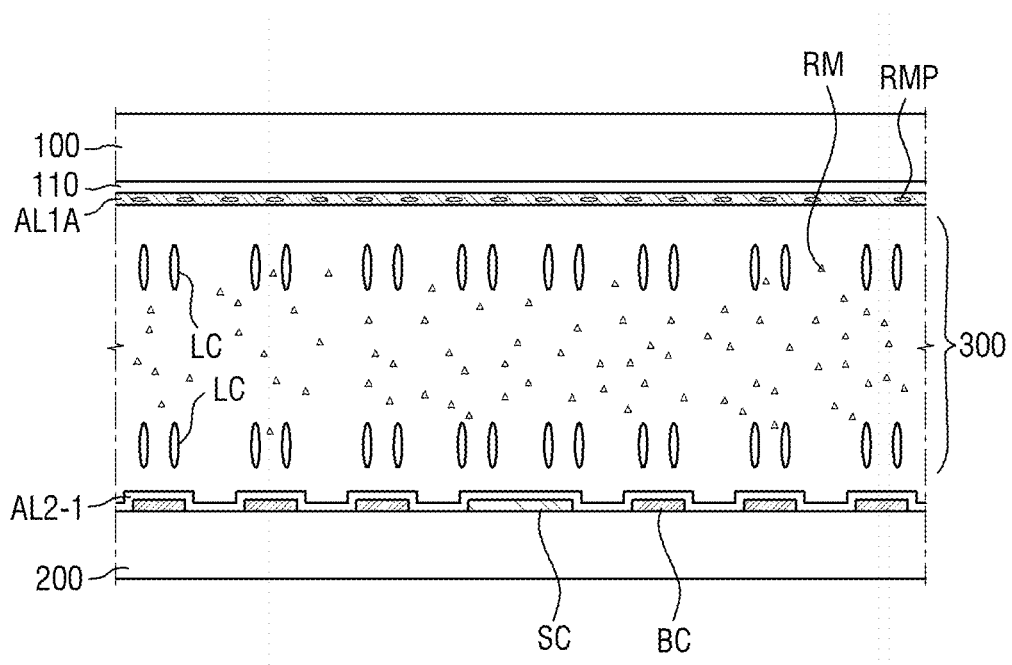

Referring to FIG. 13, the reactive mesogens included in the second vertical liquid crystal aligning agent are thermally polymerized and provided in the liquid crystal alignment layer AL1. Referring to FIG. 15, since the reactive mesogen polymers are not eluted into the liquid crystal layer 300, the liquid crystal layer 300 is provided by using the second liquid crystal composition. In other words, the reactive mesogens RM in the liquid crystal layer 300 are injected or dropped together with the liquid crystal molecules LC between the substrates 100 and 200 without being eluted into the liquid crystal layer 300 from the liquid crystal alignment layer AL1.

Figure 14A:
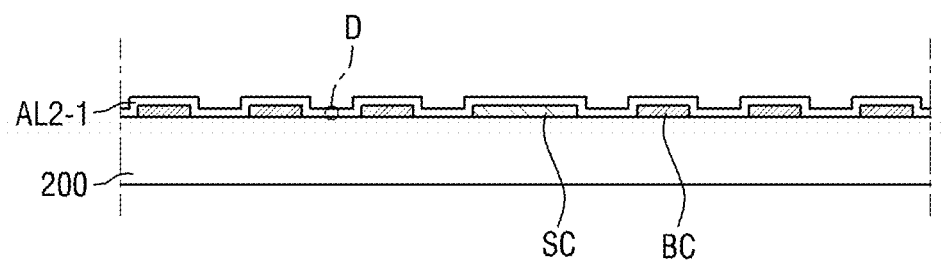
Figure 14B:
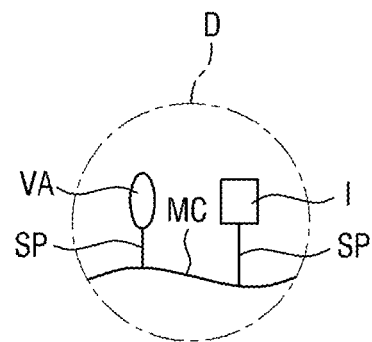

FIG. 14B is an enlarged view of a region D of FIG. 14A. Referring to FIGS. 14A and 14B, a liquid crystal alignment base layer AL2-1 may be provided by forming pixel electrodes SC and BC on a TFT array substrate 200, coating the first vertical liquid crystal aligning agent on the pixel electrodes SC and BC (refer to FIGS. 2A and 2B), and thermally curing a coating film of the first vertical liquid crystal aligning agent at a temperature, e.g., about 200° C. A vertical alignment group VA and a polymerization initiator I may be chemically bonded to a main chain MC of a polyimide-based polymer via a spacer SP.

Figure 16:
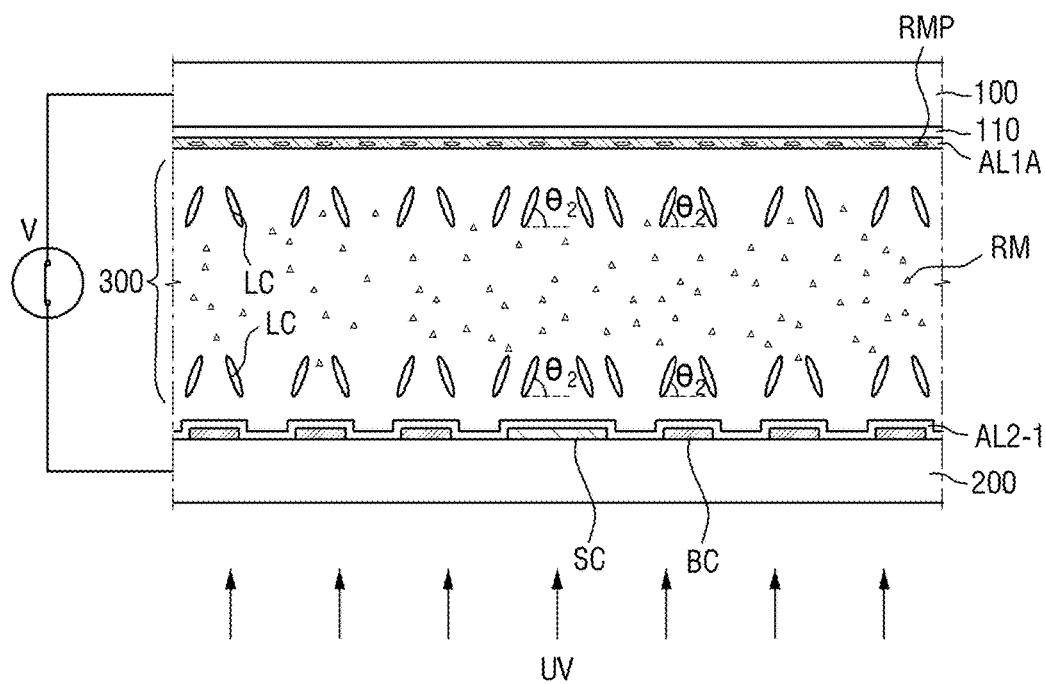
Figure 17:
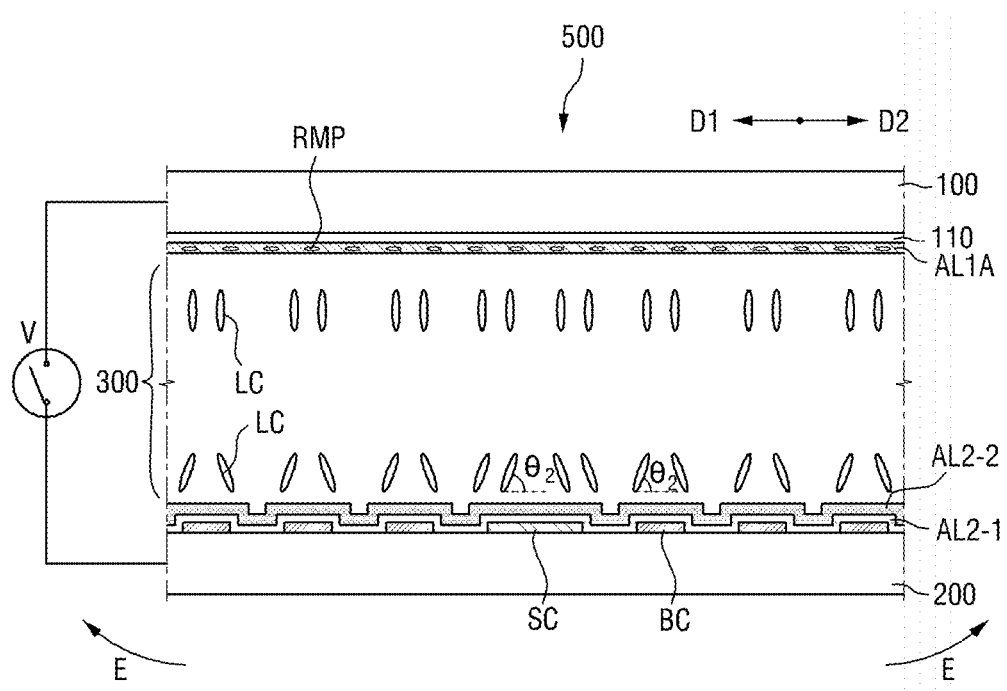

Referring to FIGS. 16 and 17, except that a liquid crystal alignment layer AL1A includes the reactive mesogen polymers RMP, the method of manufacturing the curved LCD 500CA is the same as the method of manufacturing the curved LCD 500C (refer to FIG. 3) according to the exemplary embodiment (refer to FIGS. 9 and 10).

The method of manufacturing the curved LCD 500CA according to the exemplary embodiment may be summarized as follows.

The pixel electrodes SC and BC are disposed on the TFT array substrate 200, and the first vertical liquid crystal aligning agent is coated on the pixel electrodes SC and BC. By thermally curing a coating film of the first vertical liquid crystal aligning agent, a liquid crystal alignment base layer is provided. Independently from this, the common electrode 110 is disposed on the counter substrate 100, and the second vertical liquid crystal aligning agent is coated on the common electrode 11. In an exemplary embodiment, a coating film of the second vertical liquid crystal aligning agent is thermally cured at a temperature, e.g., about 230° C., at which the reactive mesogens RM are polymerized. As a result, the liquid crystal alignment layer AL1 includes the reactive mesogen polymers RMP.

Then, after forming a liquid crystal layer between the substrates 100 and 200 by using the second liquid crystal composition and forming an LCD panel by bonding the substrates 100 and 200, by irradiating ultraviolet rays to the LCD panel, the liquid crystal alignment stabilization layer AL2-2 including projections of reactive mesogen polymers is disposed on the liquid crystal alignment base layer AL2-1 and opposite ends of the LCD panel are bent.

Figure 18:
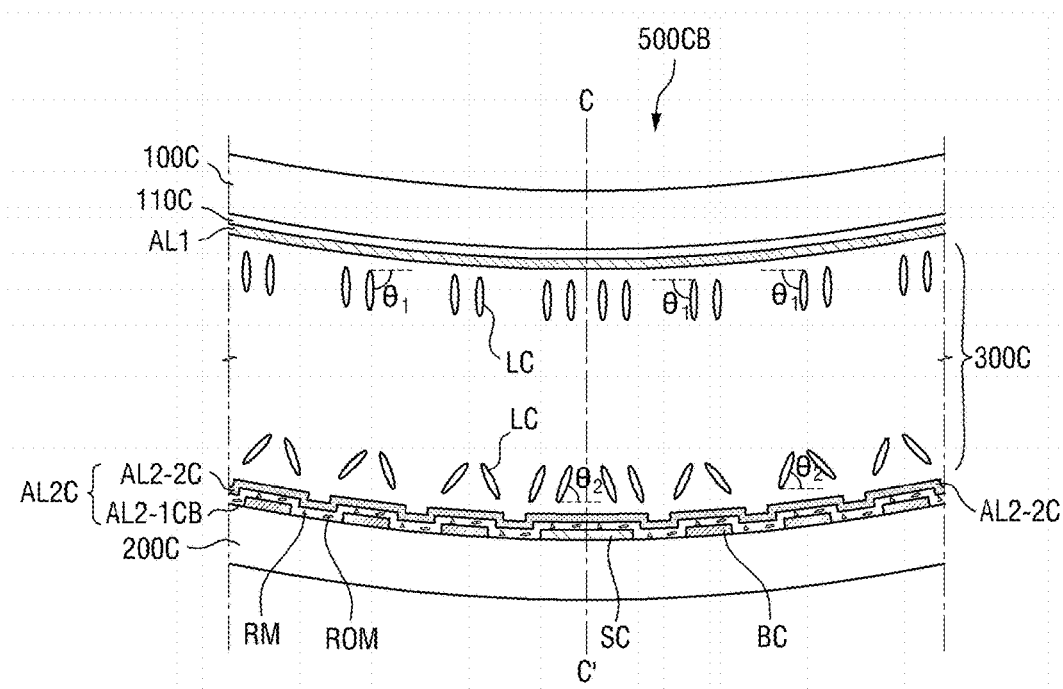
FIG. 18 is a schematic cross-sectional view of an exemplary embodiment of a curved LCD according to the invention.

FIG. 18 is a schematic cross-sectional view of a curved LCD 500CB according to an exemplary embodiment. FIGS. 19 to 24 are cross-sectional views schematically showing a method of manufacturing the curved LCD 500CB according to the exemplary embodiment.

In the following description, only differences from the curved LCD 500C (refer to FIG. 3) and a method of manufacturing the same according to the exemplary embodiment will be described, and redundant description thereof will be omitted.

The curved LCD 500CB is different from the curved LCD 500C (refer to FIG. 3) according to the exemplary embodiment in that a liquid crystal alignment base layer AL2-1CB includes the reactive mesogens RM and reactive mesogen oligomers ROM.

Figure 19:
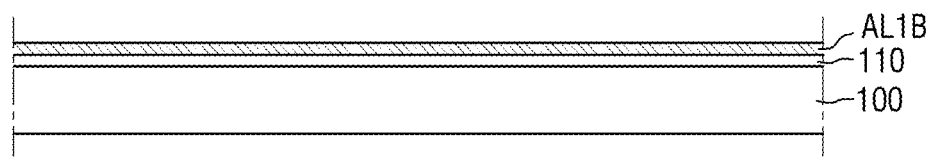
FIGS. 19 to 24 are cross-sectional views schematically showing a method of manufacturing the exemplary embodiment of a curved LCD shown in FIG. 18 according to the invention.

Referring to FIG. 19, a method of manufacturing the curved LCD 500CB is different from a method of manufacturing the curved LCD 500C (refer to FIG. 3) according to the exemplary embodiment in which the liquid crystal alignment layer AL1 is provided by using the second vertical liquid crystal aligning agent (refer to FIG. 6) in that a liquid crystal alignment layer AL1B is provided by using the vertical liquid crystal aligning agent.

Figure 20:
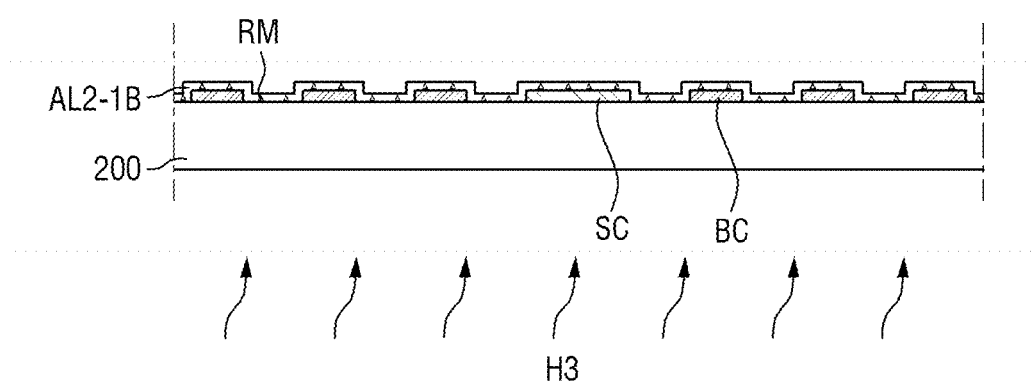

Referring to FIG. 20, a method of manufacturing the curved LCD 500CB is different from a method of manufacturing the curved LCD 500C (refer to FIG. 3) according to the exemplary embodiment in which the liquid crystal alignment base layer AL2-1 is provided by using the first vertical liquid crystal aligning agent (refer to FIG. 7A) in that a liquid crystal alignment base layer AL2-1B is provided by using the second vertical liquid crystal aligning agent.

Figure 21:
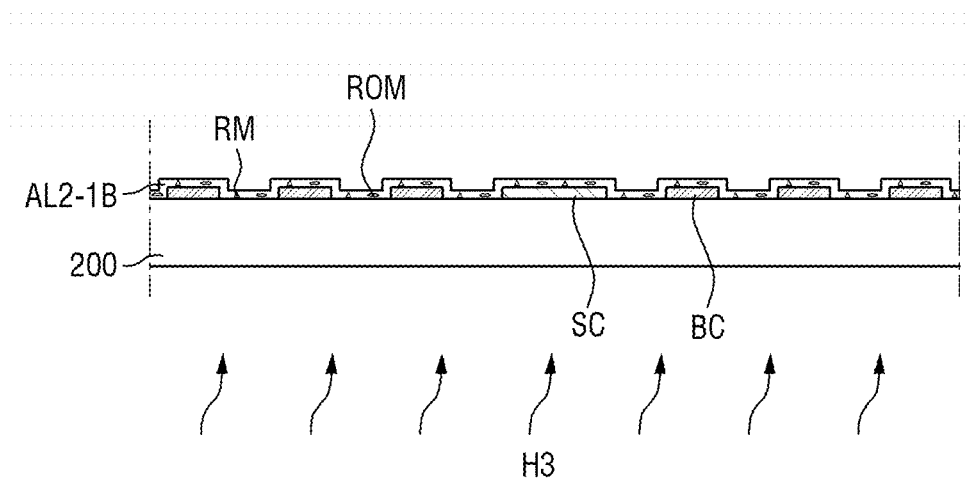

Referring to FIGS. 20 and 21, a coating film of the second vertical liquid crystal aligning agent may be thermally cured (H3) in a temperature range of about 200° C. to about 230° C., and the reactive mesogens may form the reactive mesogen oligomers ROM in a temperature range of about 200° C. to about 230° C.

The reactive mesogens RM and the reactive mesogen oligomers ROM included in the liquid crystal alignment base layer AL2-1B may initiate the photopolymerization in the same way as the photopolymerization initiator, or provide an affinity for the reactive mesogens RM in the liquid crystal layer 300 to move toward the liquid crystal alignment base layer AL2-1B.

Figure 22:
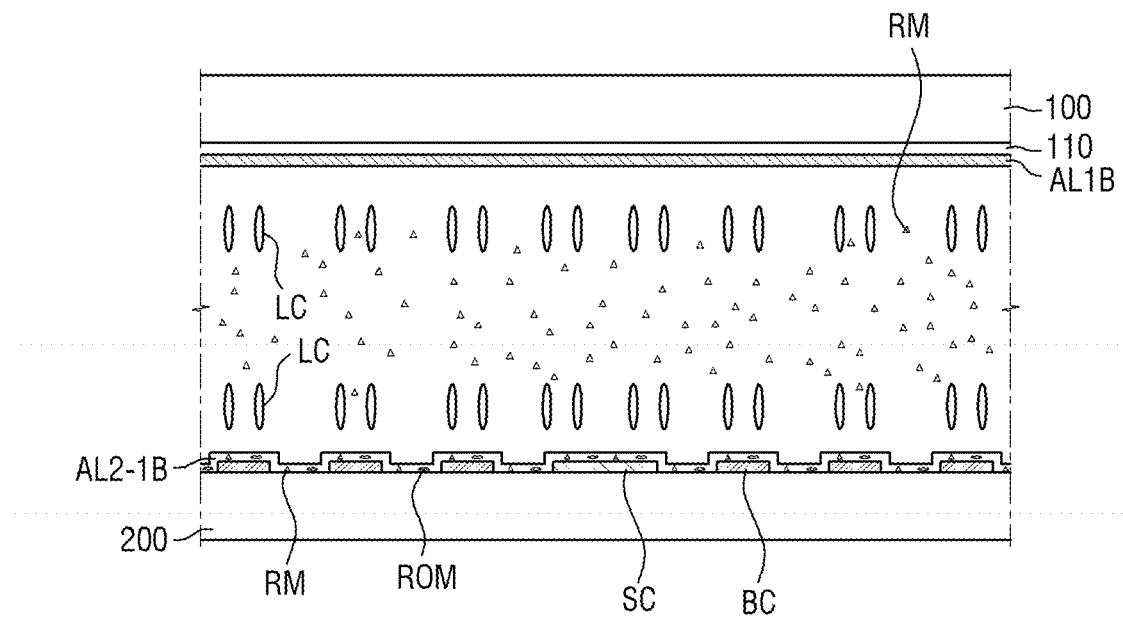

Referring to FIG. 22, since the reactive mesogen oligomers ROM are not eluted into the liquid crystal layer 300, the liquid crystal layer 300 is provided by using the second liquid crystal composition. In some cases, unreacted reactive mesogens RM may be eluted into the liquid crystal layer 300 from the liquid crystal alignment base layer AL2-1B, but most reactive mesogens RM in the liquid crystal layer 300 are injected or dropped together with the liquid crystal molecules LC between the substrates 100 and 200.

Figure 23:
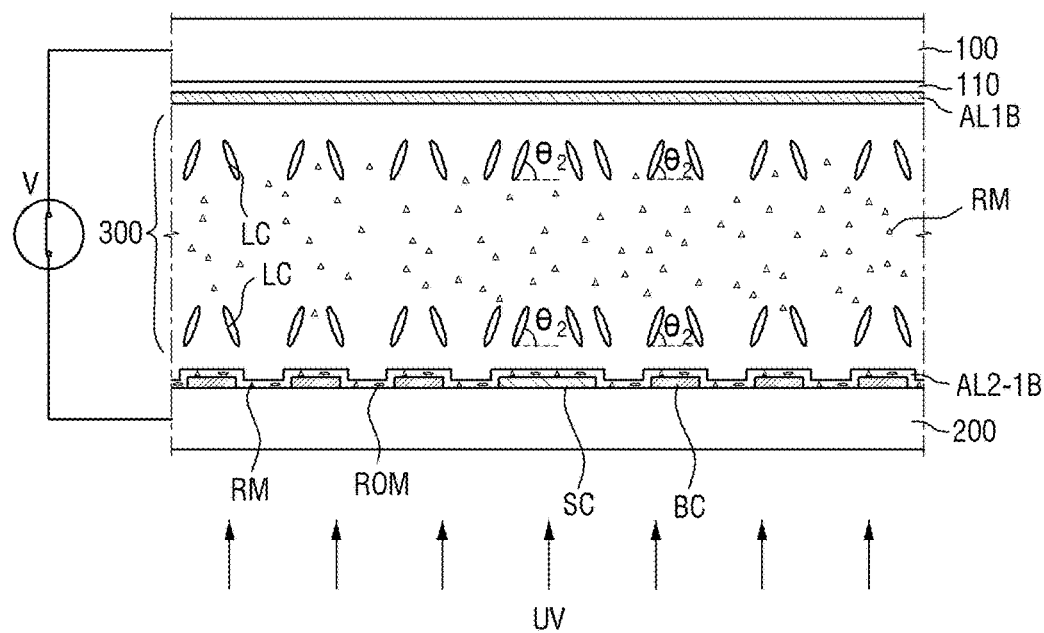
Figure 24:
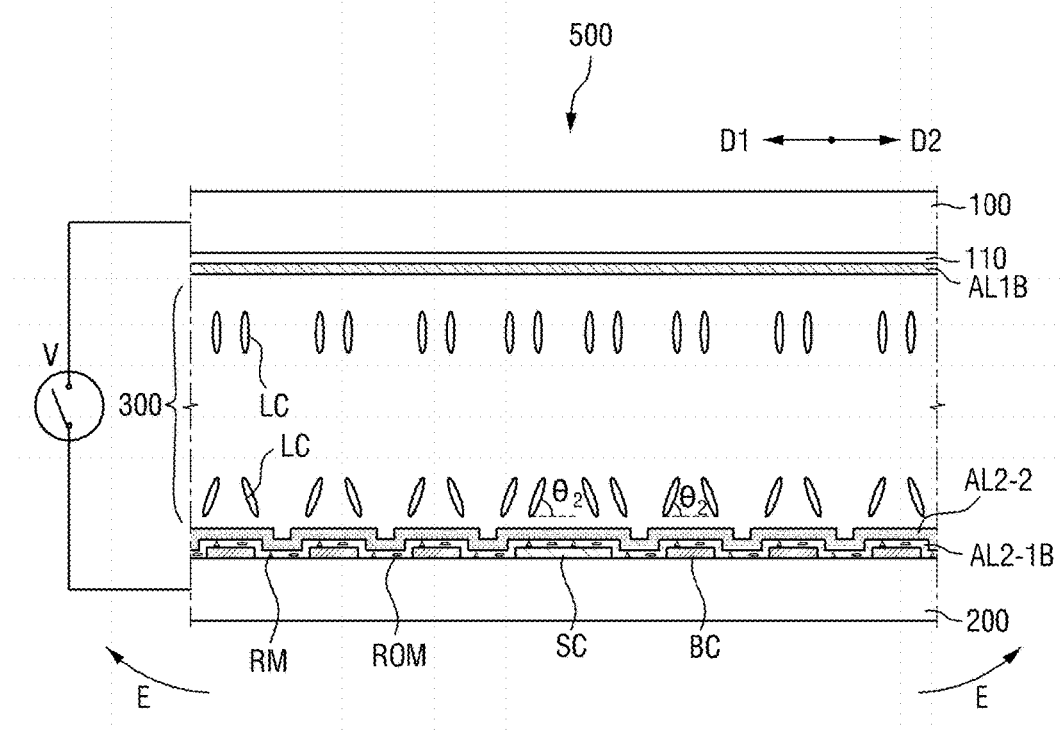

Referring to FIGS. 23 and 24, except that the liquid crystal alignment base layer AL2-1B includes the reactive mesogens RM and the reactive mesogen oligomers ROM, the method of manufacturing the curved LCD 500CB is the same as the method of manufacturing the curved LCD 500C (refer to FIG. 3) according to the exemplary embodiment (refer to FIGS. 9 and 10).

The method of manufacturing the curved LCD 500CB according to the exemplary embodiment may be summarized as follows.

The pixel electrodes SC and BC are disposed on the TFT array substrate 200, and the second vertical liquid crystal aligning agent is coated on the pixel electrodes SC and BC. In an exemplary embodiment, by thermally curing a coating film of the second vertical liquid crystal aligning agent at a temperature of about 200° C. to about 230° C., the liquid crystal alignment base layer AL2-1B is provided. Independently from this, the common electrode 110 is disposed on the counter substrate 100, the vertical liquid crystal aligning agent is coated on the common electrode 110, and a coating film of the vertical liquid crystal aligning agent is thermally cured. Then, after forming the liquid crystal layer 300 between the substrates 100 and 200 by using the second liquid crystal composition and forming an LCD panel by bonding the substrates 100 and 200, by irradiating ultraviolet rays to the LCD panel, the liquid crystal alignment stabilization layer AL2-2 including projections of reactive mesogen polymers is disposed on the liquid crystal alignment base layer AL2-1 and opposite ends of the LCD panel are bent.

While the invention has been particularly shown and described with reference to exemplary embodiments thereof, it will be understood by those of ordinary skill in the art that various changes in implementation and detail may be made therein without departing from the spirit and scope of the following claims. The exemplary embodiments should be considered in a descriptive sense only and not for purposes of limitation.

What is claimed is:

1. A curved liquid crystal display comprising:
a thin film transistor array substrate;
a counter substrate facing the thin film transistor array substrate;
a liquid crystal layer including liquid crystal molecules and disposed between the thin film transistor array substrate and the counter substrate;
a first liquid crystal alignment layer disposed between the liquid crystal layer and the counter substrate, and comprising reactive mesogen polymers; and
a second liquid crystal alignment layer disposed between the liquid crystal layer and the thin film transistor array substrate,
wherein the second liquid crystal alignment layer comprises,
  a liquid crystal alignment base layer not comprising reactive mesogen polymers, and
  a liquid crystal alignment stabilization layer disposed between the liquid crystal layer and the liquid crystal alignment base layer,
wherein the liquid crystal alignment stabilization layer includes projections spaced apart from each other on the liquid crystal alignment base layer,
wherein the projections include reactive mesogen polymers,
wherein in an initial state where an electric field is not applied,
a pretilt angle of first liquid crystal molecules aligned on a surface of the liquid crystal alignment stabilization layer is smaller than a pretilt angle of second liquid crystal molecules aligned on a surface of the first liquid crystal alignment layer.

2. The curved liquid crystal display of claim 1, further comprising:
a patternless electrode which is disposed between the counter substrate and the first liquid crystal alignment layer and does not include a domain divider; and
a pattern electrode which is disposed between the thin film transistor array substrate and the liquid crystal alignment base layer and includes a domain divider.

3. The curved liquid crystal display of claim 1, the liquid crystal alignment base layer includes a photopolymerization initiator or decomposition products of the photopolymerization initiator.

* * * * *